(12) United States Patent
Smirnov et al.

(10) Patent No.: US 10,106,902 B1
(45) Date of Patent: Oct. 23, 2018

(54) ZIRCONIUM COATING OF A SUBSTRATE

(71) Applicants: Alexander Smirnov, Huntsville, AL (US); Scott O'Dell, Arab, AL (US); Anatoliy Shchetkovskiy, Owens Cross Roads, AL (US)

(72) Inventors: Alexander Smirnov, Huntsville, AL (US); Scott O'Dell, Arab, AL (US); Anatoliy Shchetkovskiy, Owens Cross Roads, AL (US)

(73) Assignee: Plasma Processes, LLC, Huntsville, AL (US)

( * ) Notice: Subject to any disclaimer, the term of this patent is extended or adjusted under 35 U.S.C. 154(b) by 30 days.

(21) Appl. No.: 15/465,160

(22) Filed: Mar. 21, 2017

Related U.S. Application Data (60) Provisional application No. 62/311,496, filed on Mar. 22, 2016.

(51) Int. Cl.
*C25C 3/26* (2006.01)
*C25D 3/66* (2006.01)
(Continued)

(52) U.S. Cl.
CPC ............... *C25C 3/26* (2013.01); *B32B 15/01* (2013.01); *C01D 3/02* (2013.01); *C01G 25/04* (2013.01);
(Continued)

(58) Field of Classification Search
CPC .................................. C25D 3/66; C25C 3/26
(Continued)

(56) References Cited

U.S. PATENT DOCUMENTS

| 3,444,058 A | 5/1969 | Mellors |
| 3,713,993 A | 1/1973 | Mellors |

(Continued)

FOREIGN PATENT DOCUMENTS

| CA | 688546 A | 6/1964 |
| CN | 104628395 A | 5/2015 |

(Continued)

OTHER PUBLICATIONS

Kipouros, G. J. et al. "Electrorefining of Zirconium Metal in Alkali Chloride and Alkali Fluoride Fused Electrolytes" Journal of the Electrochemical Society, vol. 132, No. 5, p. 1087-1098. (Year: 1985).*

(Continued)

*Primary Examiner* — Brian W Cohen
(74) *Attorney, Agent, or Firm* — Atlanta Technology Law; Luke Anderson

(57) ABSTRACT

This invention provides an electrolyte salt for use in an electrodeposition process for depositing Zirconium metal on a thin foil substrate. The prior art electrochemical process causes a reaction between a uranium substrate and $ZrF_4$ species in the electrolyte that causes the formation of $UF_x$ at the substrate surface that prevents the formation of a dense uniform zirconium coating. This problem is solved by using an electrolyte salt in an electrodeposition process consisting of lithium fluoride (LiF) in a concentration ranging between about 11.5 molar percent and about 61 molar percent and one or more salts selected from the group consisting of sodium fluoride (NaF), potassium fluoride (KF), cesium fluoride (CsF), or cesium chloride (CsCL). Zirconium is added to the electrolyte salt through an addition of zirconium fluoride ($ZrF_4$) in the range of about 1 to about 5 mass percent (w/w %). The Zr coating is of at least 98% pure Zr with a density of at least 98%.

16 Claims, 6 Drawing Sheets

(51) Int. Cl.
*C25D 5/48* (2006.01)
*C01G 25/04* (2006.01)
*C01D 3/02* (2006.01)
*B32B 15/01* (2006.01)
*C25D 3/48* (2006.01)

(52) U.S. Cl.
CPC ............... *C25D 3/48* (2013.01); *C25D 3/66* (2013.01); *C25D 3/665* (2013.01)

(58) Field of Classification Search
USPC ................................................. 205/397, 230
See application file for complete search history.

(56) References Cited

U.S. PATENT DOCUMENTS

| | | | |
|---|---|---|---|
| RE28,250 E | 11/1974 | Senderoff | |
| 4,293,535 A | 10/1981 | Arendt | |
| 4,610,736 A | 9/1986 | Barrett | |
| 5,215,631 A | 6/1993 | Westfall | |
| 7,100,670 B1 | 9/2006 | Hofman | |
| 8,163,122 B1 | 4/2012 | Gooch | |
| 8,968,547 B2 | 3/2015 | Loewen | |
| 9,180,550 B2 | 11/2015 | Kusuda | |
| 2010/0261034 A1 | 10/2010 | Cardarelli | |
| 2011/0108434 A1* | 5/2011 | Fujita | C22B 34/14 205/397 |
| 2011/0132769 A1* | 6/2011 | Hurst | C25D 3/56 205/157 |
| 2014/0144786 A1 | 5/2014 | Lee | |

FOREIGN PATENT DOCUMENTS

| | | |
|---|---|---|
| EP | 0048284 B1 | 4/1987 |
| EP | 997555 B1 | 2/2004 |
| GB | 989806 A | 4/1965 |
| JP | 2002537481 A | 11/2002 |
| JP | 2003344578 A | 12/2003 |
| JP | 2005314775 A | 11/2005 |
| JP | 2013224488 A | 10/2013 |
| JP | 5483867 B2 | 5/2014 |
| KR | 1020120105232 A | 9/2012 |
| KR | 1015979001 B1 | 2/2016 |
| RU | 2272785 C1 | 3/2006 |
| WO | WO2013065511 A1 | 5/2013 |

OTHER PUBLICATIONS

Nissen, D.A., "Zirconium Electroplating on Uranium From Molten Alkali Fluoride Salts, AEC Research & Development Report," Jun. 1, 1968, 36 pages.
Lavender, CA, "Concept Feasibility Report for Using Co-Extrusion to Bond Metals to Complex Shapes of U-10Mo," Dec. 2013, 38 pages.
Coffey, GW, "Concept Feasibility Report for Electroplating Zirconium onto Uranium Foil," Mar. 2015, 44 pages.
Moore, G.A., "Co-Rolled U10Mo/Zirconium-Barrier-Layer Monolithic Fuel Foil Fabrication Process," Jan. 2010, 23 pages.
Lotts, AL, "Review of Information on U-Mo Alloys and U-Mo-UO2 Dispersion Fuels," Jun. 30, 2960, 69 pages.
Oak Ridge National Laboratory' "The Development Status of Molten-Salt Breeder Reactors", Aug. 1972, 434 pages.
Oak Ridge National Laboratory, "Phase Diagrams of Nuclear Reactor Materials," Nov. 20, 1959, 211 pages.
Hollis, K.J. , "Plasma Spraying of Diffusion Barrier Coatings for LEU Monolithic Fuel," Oct. 14, 2012, 8 pages.
Senor, DJ, "Fuel Fabrication Capability Research and Development Plan, Global Threat Reduction Initiative-Convert Program" Apr. 2014, 82 pages.
Nyberg, EA, "Summary of Compression Testing of U-10Mo," Oct. 2012, 32 pages.
Teter, David, "Talking Points for Russian Laboratory Director's Tour," Jun. 5, 2011, 6 pages.
Burkes, D.E., "Thermophysical Properties of U-10Mo Alloy," Nov. 2010, 19 pages.
www.moltensalt.org—reference site energy-related, molten salt technologies. Landing page-1 page. Last modified Sep. 10, 2012.

* cited by examiner

ZIRCONIUM COATING OF A SUBSTRATE

PRIORITY CLAIM

This application claims priority to provisional application Ser. No. 62/311,496 filed on Mar. 22, 2016, which is fully incorporated herein by reference.

TECHNICAL FIELD

This disclosure is related to a coating for electrically conductive substrates and nuclear fuel, and more particularly, related to a zirconium coating for metals, refractory metals, refractory metal alloys, uranium, uranium alloys and more particularly uranium-10 molybdenum.

BACKGROUND

Desirable in the art is a new zirconium coating on electrically conductive substrates, refractory metals, refractory metal alloys, uranium and uranium alloy substrates and more specifically uranium-10 molybdenum foils to prevent a reaction between the fuel and reactor cladding materials. Electrochemical processes have been used to form a zirconium coating on uranium-10 molybdenum substrates. These electrochemical processes have caused a reaction between the uranium substrate and $ZrF_4$ species in the electrolyte. This reaction causes the formation of $UF_x$ at the substrate surface preventing the formation of a dense uniform zirconium coating. The present invention solves this problem.

BRIEF DESCRIPTION OF THE DRAWINGS

The accompanying drawings illustrate various aspects of the invention and preferred embodiments of the invention, as well as other information pertinent to the disclosure, in which.

DETAILED DESCRIPTION

Exemplary embodiments are first discussed with reference to the figures. Although these embodiments are described in detail, they are provided for purposes of illustration only and various modifications are feasible within the scope of the invention. After the exemplary embodiments are described, examples of diagrams are provided to explain the manner in which the zirconium coating of the substrate is achieved.

Electrodeposition Apparatus

Figure 1:
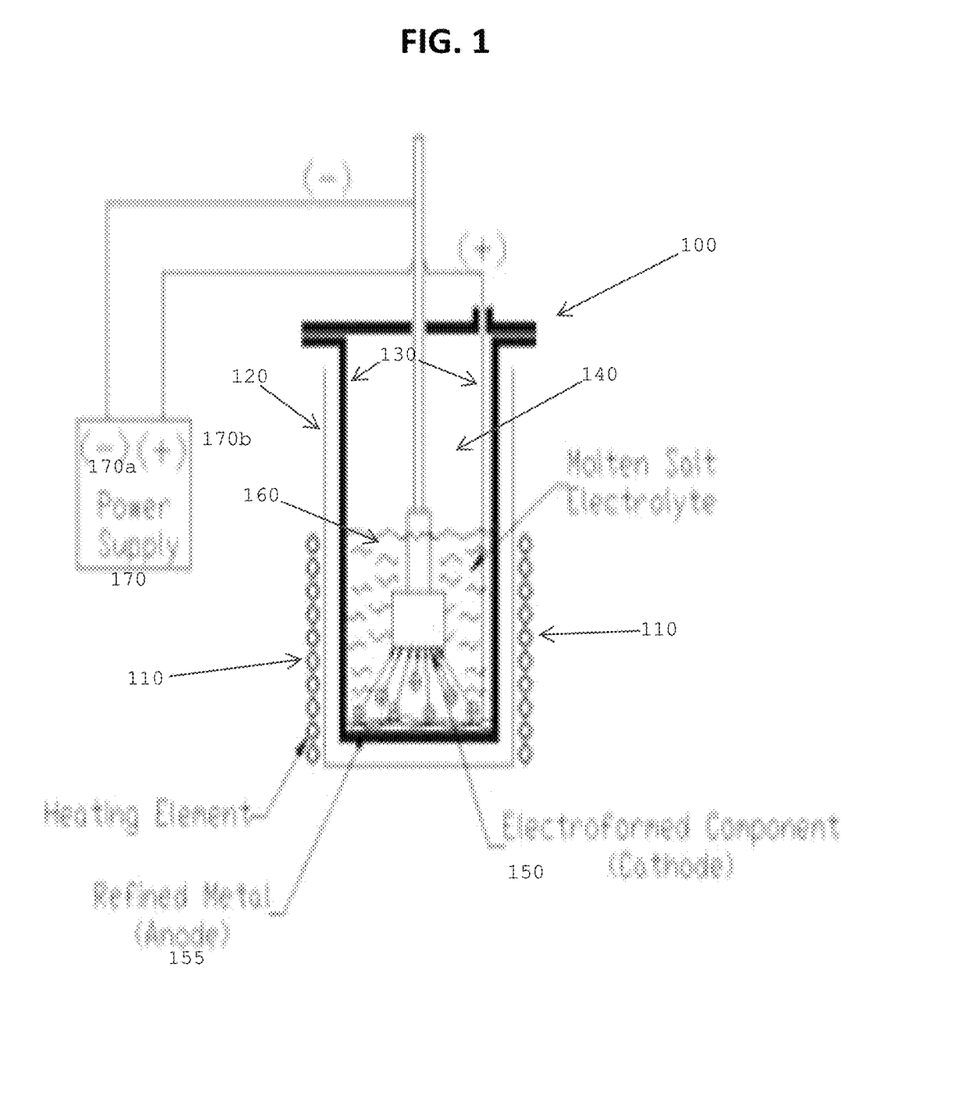
FIG. 1 is a schematic system diagram of an electrodeposition unit.

Referring to FIG. 1, an electrodeposition unit 100, a plurality of heating elements 110 between an outer crucible 120 wall and an inner crucible wall 130. The electrodeposition unit 100 has an interior crucible chamber 140 containing at least one cathode 150 and at least one anode 155 which may be selected from a group of refined metals. The cathode 150 is the component or substrate that will be coated. The crucible chamber 140 is charged with a salt electrolyte 160. An external power supply 170 is applied by passing the negative current 170a to the cathode 150 and the positive current 170b into the molten salt electrolyte 160. The electrodeposition unit 100 may optionally have one or more manual stirring agitators (not shown) in the molten salt electrolyte 160 to improve circulation of the molten salt electrolyte 160 and thereby minimize thermal gradients in the salt electrolyte 160.

Electrolyte/Molten Salt Bath

A zirconium coating is accomplished by having Zr ions in a conductive molten salt electrolyte. The electrolyte can be comprised of alkali based fluoride, chloride, or a combination of fluoride-chloride based salts such as CsCl, KCl, LiCl, NaCl, CsF, KF, LiF, and NaF. The Zr species is added to the electrolyte using $ZrCl_4$, $ZrF_4$, or a combination of both $ZrCl_4$ and $ZrF_4$. The mixture of salts is then heated to a temperature between 400° C. to 1000° C., or more preferably to a temperature between 500° C. and 650° C., in the interior crucible chamber 140 of an electrodeposition unit 100 to form the molten electrolyte 160.

Figure 2:
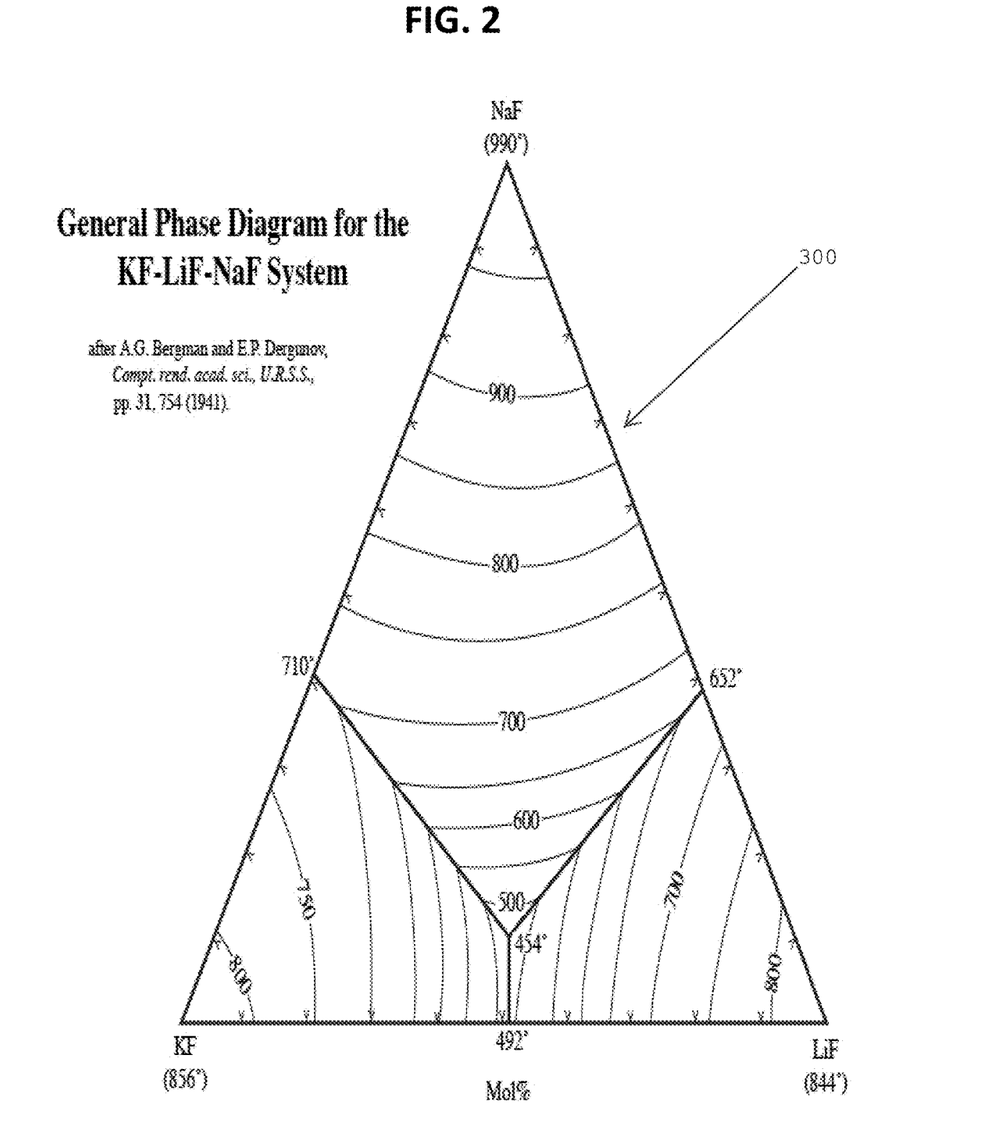
FIG. 2 is a ternary phase diagram of the KF—LiF—NaF system.

Referring to FIG. 2, which is a ternary phase diagram for the LiF—NaF—KF system 300. This electrolyte mixture having a concentration of LiF-11.5 mol %, NaF-42 mol %, KF with a eutectic reaction at 454° C. may be used as a molten salt electrolyte 160. This mixture is heated to a range from 400° C. to 1000° C., or more preferably to a range of 450° C. to 750° C., in the interior crucible chamber 140 of an electrodeposition unit 100 to form the molten salt electrolyte 160. $ZrF_4$ is introduced in the electrolyte mixture at a concentration between 1% and 5 mass percent (w/w %).

An alternative electrolyte mixture having a concentration of LiF-61 mol %, CsF with a eutectic reaction at 479° C. may be used as a molten salt electrolyte 160. This mixture is heated to a range from 400° C. to 1000° C., or more preferably to a range of 450° C. to 600° C., in the interior crucible chamber 140 of an electrodeposition unit 100 to form the molten salt electrolyte 160. $ZrF_4$ is introduced in the electrolyte mixture at a concentration between 1% and 5 mass percent (w/w %).

Another alternative electrolyte mixture having a concentration of LiF-53 mol %, CsF-35 mol %, CsCl may be used as a molten salt electrolyte 160. This mixture is heated to a range from 400° C. to 1000° C., or more preferably to a range of 450° C. to 600° C., in the interior crucible chamber 140 of an electrodeposition unit 100 to form the molten salt electrolyte 160. $ZrF_4$ is introduced in the electrolyte mixture at a concentration between 1% and 5 mass percent (w/w %).

Substrate Preparation

The substrates must be prepared before coating to remove moisture, debris, or oxide scale from the surface of the sample. Surface preparation can be performing using alcohol rinse, chemical etching/cleaning, grit blast/mechanical machining, vacuum bake-out, and/or electrochemical polishing.

Electroplating Process Parameters

High processing temperatures in excess of 450° C. are required to keep the electrolyte in a liquid form 160. The electrolyte 160 is heated at a ramp rate of <100° C. per minute and held at its target temperature for at least one hour before plating is begun.

Direct, pulse or pulse-reverse plating can be used to apply the zirconium coating to the uranium substrate.

Zirconium Coating

Figure 3:
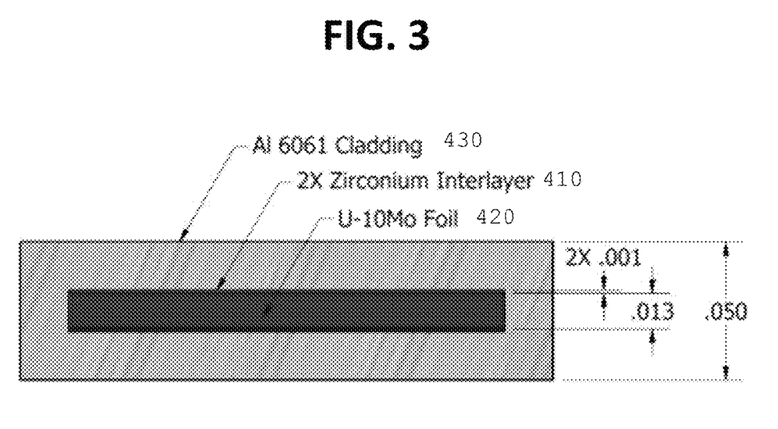
FIG. 3 is a schematic of the uranium substrate, zirconium interlayer coating, and an aluminum cladding.
Figure 4:
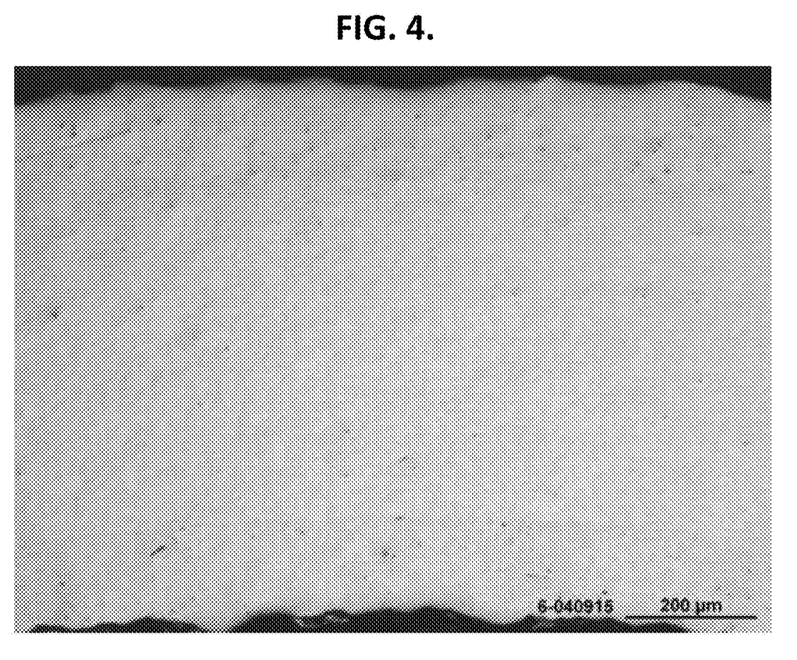
FIG. 4 is a Scanning Electron Microscopy (SEM) view of the zirconium coating of a test substrate foil.

The zirconium coating is applied and adhered directly to numerous substrates including metallic, refractory metals and uranium, and alloys thereof. The refractory metals include niobium, molybdenum, tantalum, tungsten, rhenium, titanium, vanadium, chromium, zirconium, ruthenium, rhodium, hafnium, osmium iridium, and alloys thereof. The uranium substrates include uranium, highly enriched uranium, low-enriched uranium, or uranium alloy substrate. In one preferred embodiment, the substrate is a uranium-10 molybdenum foil. Other electrically conductive substrates such as carbon, metals, and carbide materials can also be coated. The zirconium coating is applied to all substrate surfaces so that the zirconium coating fully coats and encapsulates the substrate and forms a coating, which can be used for a diffusion barrier, corrosion barrier, oxidation barrier, etc. Referring to FIG. 3, the zirconium coating ranges in thickness from 1 to 25 μm 410, but can be thicker. Optionally, additional coating may be applied on top of the zirconium encapsulated substrate 420 to form a cladding. Once the zirconium coating of the uranium substrate has cooled to room temperature, a second coating can be applied to the zirconium encapsulated substrate 430. The second coating can be selected from a group of aluminum alloys consisting of aluminum alloys in series 4000, 5000, and 6000; and more specifically aluminum alloy 6061. The second coating layer ranges in thickness from 1 to 25 μm. 430.

Physical Properties of the Zirconium Coating

Figure 5:
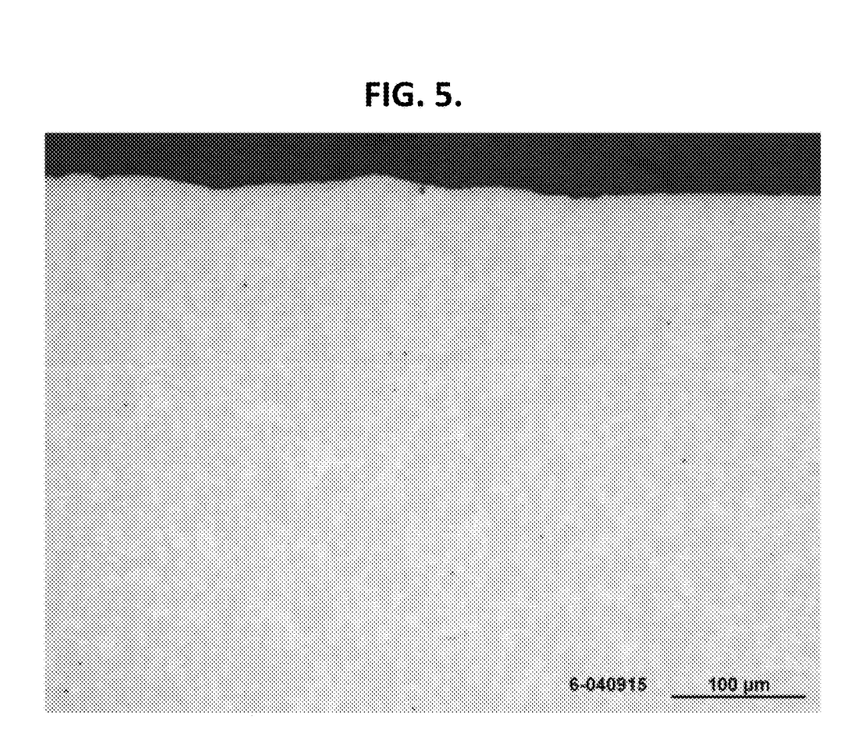
FIG. 5 is a SEM view of the zirconium coating substrate interface.
Figure 6:
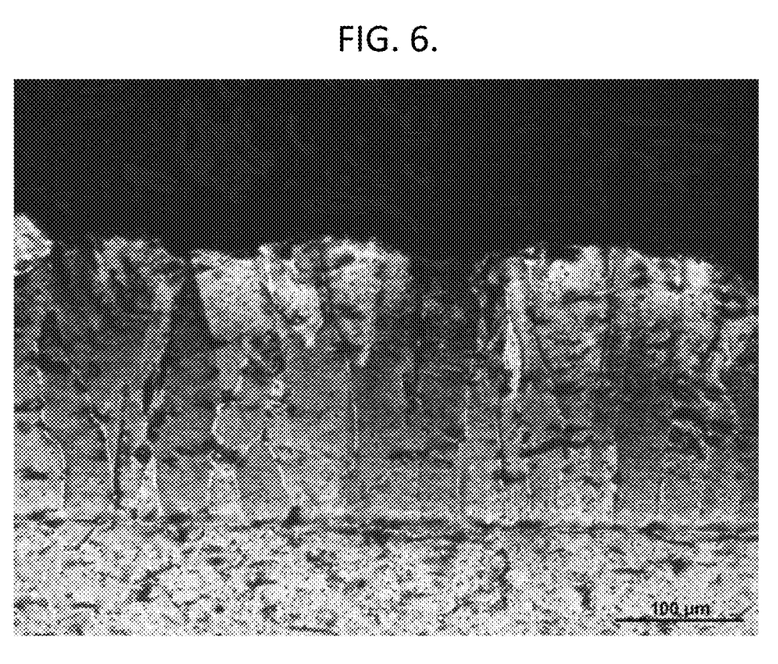
FIG. 6 is an etched bright field (BF) Optical Microscopy image of the zirconium microcrystalline columnar grain structure.

The zirconium coating has a purity of greater than 98% Zr, and more preferably greater than 99% Zr on a metal basis. The zirconium coating has a density of greater than 98%, and more preferably greater than 99%. The electroplating process can generate a variety of Zr coating microstructures. Referring to FIGS. 5 and 6, there is no contamination or reaction at the interface between the zirconium coating and the substrate. A strong physical bond is formed between the zirconium coating and the substrate such that the substrate can be bent, twisted, or deformed and there is no cracking or debonding of the zirconium coating. Referring to FIG. 7, in preferred microstructure is a columnar grain structure. The average microstructure grain size varies according to the deposition temperature. The higher the deposition temperature results in larger grain sizes. The lower the deposition temperature results in smaller grain sizes. In the preferred embodiment a grain size of 35 microns is produced.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed is:

1. A molten salt bath for use in an electrodeposition process for forming an at least 98 percent pure zirconium metal coating directly on a substrate consisting essentially of:
    lithium fluoride (LiF) in a concentration ranging between about 11.5 molar percent and about 61 molar percent;
    one or more salts selected from the group consisting of sodium fluoride (NaF), potassium fluoride (KF), or cesium fluoride (CsF);
    cesium chloride (CsCl); and,
    an addition of zirconium fluoride (ZrF$_4$) in the range of about 1 to about 5 mass percent (w/w %).

2. The molten salt bath of claim 1 wherein the LiF concentration is about 12 molar percent, the CsF concentration is about 53 molar percent, and the concentration of CsCl is about 35 molar percent.

3. A process for making a high purity zirconium coating on a thin foil substrate by electrodeposition comprising:
    Providing an electrodeposition unit with a plurality of heating elements and an interior crucible chamber containing at least one anode and at least one cathode, wherein the cathode is a thin foil;
    Filing the interior crucible chamber with an electrolyte consisting essentially of: lithium fluoride (LiF) in a concentration ranging between about 11.5 molar percent and about 61 molar percent; one or more salts selected from the group consisting of sodium fluoride (NaF), potassium fluoride (KF), or cesium fluoride (CsF); cesium chloride (CsCl); and, an addition of zirconium fluoride (ZrF$_4$) in the range of about 1 to about 5 mass percent (w/w %);
    Forming a molten salt bath by heating the electrolyte in the interior crucible chamber to between 400° C. to 650° C.;
    Submerging the thin foil substrate into the molten salt bath; and,
    Encapsulating all surfaces of the thin foil substrate with a Zirconium (Zr) metal coating wherein the Zr coating is at least 98% Zr metal.

4. A process for making a high purity Zirconium coating on a thin foil according to claim 3 wherein the electrolyte consists essentially of LiF-12 molar percent, CsF-53 molar percent, and CsCl-35 molar percent.

5. A process for making a high purity Zirconium coating on a thin foil according to claim 3 wherein the Zr metal coating is between about 1 μm and 25 μm thick.

6. A process of making a high purity Zirconium coating on a thin foil substrate according to claim 3 wherein the thin foil substrate consists of an electrically conductive substrate.

7. A process for making a high purity Zirconium coating on a thin foil according to claim 3 wherein the thin foil substrate is uranium.

8. A process for making a high purity Zirconium coating on a thin foil according to claim 3 wherein the thin foil substrate is a uranium alloy.

9. A process for making a high purity Zirconium coating on a thin foil according to claim 3 wherein the thin foil substrate is a uranium-10 molybdenum.

10. A process for making a high purity Zirconium coating on a thin foil according to claim 3 wherein the Zr coating has a density of at least 99%.

11. A process for making a high purity Zirconium coating on a thin foil according to claim 3 wherein the Zr coating has a columnar microstructure.

12. A process for making a high purity Zirconium coating on a thin foil according to claim 11 wherein the columnar microstructure has a grain size of about 35 µm.

13. A process for making a high purity Zirconium coating on a thin foil according to claim 3 further comprising:
   Cooling the thin foil substrate encapsulated with a Zr metal coating to room temperature;
   Applying a coating of an aluminum alloy directly on the Zr metal coating forming a cladding selected from the group consisting of: aluminum alloys in series 4000, 5000, and 6000.

14. A process for making a high purity Zirconium coating on a thin foil according to claim 13 wherein the coating of aluminum alloy is aluminum alloy 6061.

15. A process for making a high purity Zirconium coating on a thin foil according to claim 13 wherein the coating of aluminum alloy is between about 1 µm and about 25 µm thick.

16. A process for making a high purity Zirconium coating on a thin foil according to claim 6 wherein the thin foil substrate is selected from the group consisting of: uranium, uranium alloy, carbon, zirconium, metallic, refractory metal, or a refectory metal alloy.

* * * * *